(12) United States Patent  
Nestares et al.

(10) Patent No.: US 8,611,661 B2
(45) Date of Patent: Dec. 17, 2013

(54) OCR MULTI-RESOLUTION METHOD AND APPARATUS

(75) Inventors: Oscar Nestares, San Jose, CA (US); Badusha Kalathiparambil, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1031 days.

(21) Appl. No.: 11/964,590

(22) Filed: Dec. 26, 2007

(65) Prior Publication Data

US 2009/0169131 A1    Jul. 2, 2009

(51) Int. Cl.
*G06K 9/34* (2006.01)
(52) U.S. Cl.
USPC .................. 382/176; 382/177; 382/182
(58) Field of Classification Search
USPC ............... 382/173–180, 182–186, 229–231
See application file for complete search history.

(56) References Cited

U.S. PATENT DOCUMENTS

| | | | | |
|---|---|---|---|---|
| 5,067,164 | A * | 11/1991 | Denker et al. | 382/158 |
| 5,907,642 | A * | 5/1999 | Ito | 382/302 |
| 5,956,468 | A * | 9/1999 | Ancin | 358/1.9 |
| 6,470,094 | B1 * | 10/2002 | Lienhart et al. | 382/176 |
| 6,668,101 | B2 * | 12/2003 | Kaneda | 382/301 |
| 6,973,210 | B1 * | 12/2005 | Platt et al. | 382/162 |
| 6,973,213 | B2 * | 12/2005 | Fan et al. | 382/176 |
| 7,593,600 | B2 * | 9/2009 | Prakash et al. | 382/298 |
| 2002/0159636 | A1 * | 10/2002 | Lienhart et al. | 382/176 |
| 2005/0276515 | A1 * | 12/2005 | Shekter | 382/286 |
| 2008/0126415 | A1 * | 5/2008 | Chaudhury et al. | 707/104.1 |
| 2009/0161991 | A1 * | 6/2009 | Nestares | 382/296 |

FOREIGN PATENT DOCUMENTS

| | | |
|---|---|---|
| JP | 08-339424 A2 | 12/1996 |
| JP | 2000-293633 A2 | 10/2000 |
| JP | 2006-011967 A | 1/2006 |
| JP | 2006-106931 A | 4/2006 |
| WO | 2009/085491 A2 | 7/2009 |

OTHER PUBLICATIONS

Kanopoulus et al. "Design of an Image Edge Detection Filter Using the Sobel Operator" IEEE Journal of Solid State Circiuts vol. 23 No. 2 Apr. 1988.*

Anthimopoulos et al "Multiresolution Text detecting in video frames" VISAPP 2007: Proceedings of the Second International Conference on Computer Vision Theory and Applications, Barcelona, Spain, Mar. 2007—vol. 2. pp. 161-166.*

Unser et al B-spline signal processing: Part II Efficient Design and Applications. IEEE transactions on Signal processing vol. 41 No. 2 Feb. 1993.*

Wu et al "Finding text in images" '97 Proceedings of the second ACM international conference on Digital libraries.*

International Search Report/ Written Opinion received for PCT Patent Application No. PCT/US2008/084584, Mailed on Jun. 30, 2009, pp. 11.

Burt, Peter J. "The Laplacian Pyramid as Compact Image Code", IEEE Transactions on Communications, vol. COM-31, No. 4, Apr. 1983; 9 pages.

* cited by examiner

*Primary Examiner* — Sean Motsinger
(74) *Attorney, Agent, or Firm* — Schwabe, Williamson & Wyatt, P.C.

(57) ABSTRACT

In some embodiments, provided are procedures for processing images that may have different font sizes. In some embodiments, it involves OCR'ing with multiple passes at different resolutions.

25 Claims, 3 Drawing Sheets

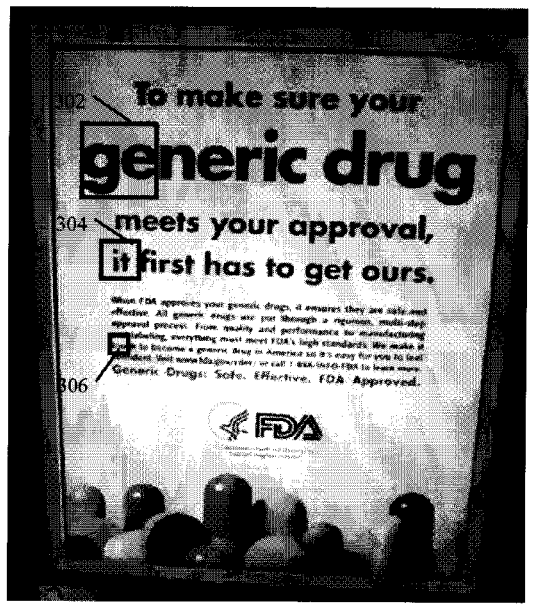
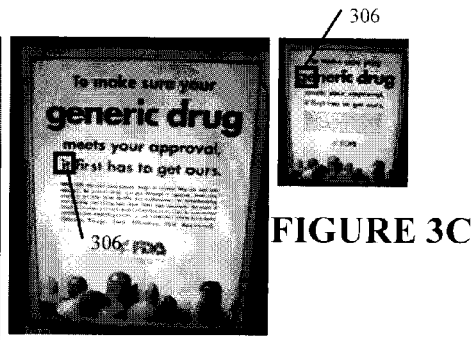
FIGURE 3C
FIGURE 3B
FIGURE 3A

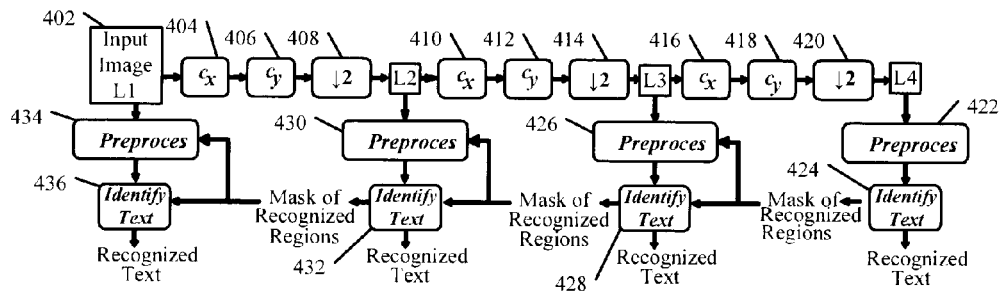
FIGURE 4
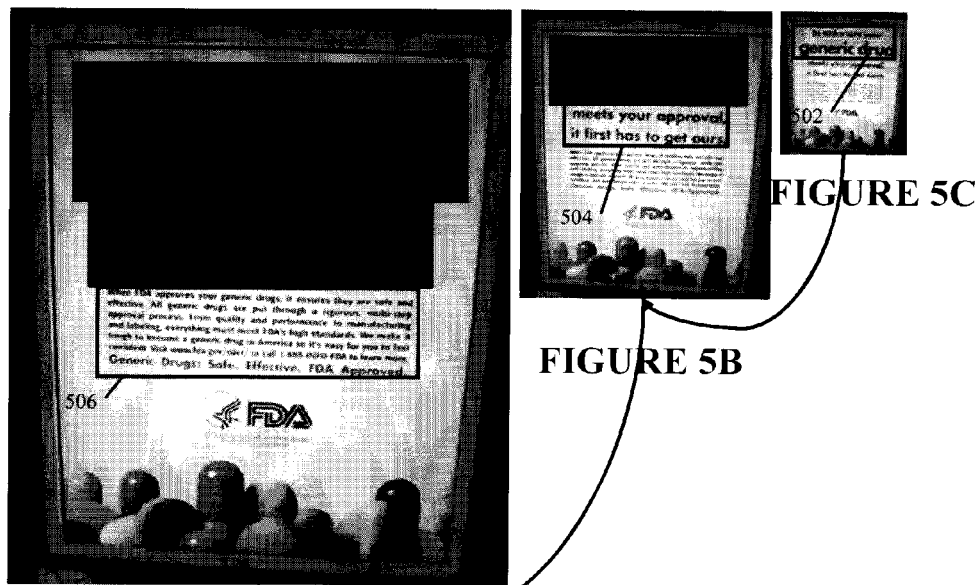
FIGURE 5A
FIGURE 5B
FIGURE 5C

OCR MULTI-RESOLUTION METHOD AND APPARATUS

BACKGROUND

The embodiments of the invention relate to a reading machine for print or reading impaired persons such as individuals who are visually impaired or have dyslexia.

People with disabilities, such as impaired vision or dyslexia, may have difficulty reading printed material. Automatic systems are needed to render images as audio recordings.

It is known to provide a mobile print digitizer for the visually impaired. One known device captures printed images and reads them to the user. A camera or scanner captures an image of a printed page, and then runs optical character recognition (OCR) on the image. The output is fed to a speech synthesizer such as a text-to-speech system (TTS). For devices to be able to effectively read to a person, in real-time, they should be able to efficiently perform complicated optical character recognition (OCR) and characterization, even with images having a variety of differently sized text. Accordingly, an approach for OCR processing capable of more efficiently identifying text of different sizes may be desired.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 3A-3C illustrate different image resolutions for OCR'ing with a common operator window in accordance with some embodiments.

FIG. 4 is a flow diagram showing a process for performing OCR with multiple, different resolution passes in accordance with some embodiments.

FIGS. 5A-5C demonstrate how OCR could be performed using the process of FIG. 4 in accordance with some embodiments.

DETAILED DESCRIPTION

One of the challenges for reading device users is that the types of images selected for reading can vary greatly, for example, from magazines and newspapers to menus, labels, brochures and instructions. some of these images can have wide variances in the sizes of the fonts used in their text. Accordingly, in some embodiments, provided are procedures for processing images that may have large ranges of font sizes, both within the same image and/or across images. In some embodiments, it involves OCR'ing with multiple passes at different resolutions.

Figure 1:
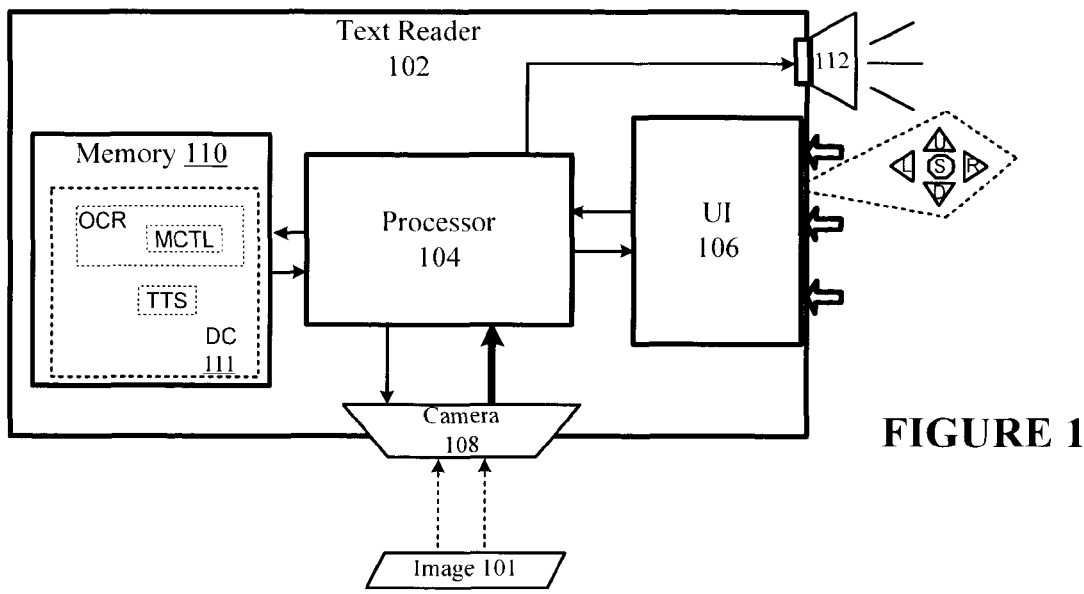
FIG. 1 is a diagram of a reading apparatus in accordance with some embodiments.

FIG. 1 shows a block diagram of a reading apparatus 102 to read to a user an image 101 to be scanned in accordance with some embodiments. Reader 102 generally comprises a processor 104, user interface 106, camera 108, memory 110, and an auditory output device 112, coupled together as shown.

The camera may comprise any suitable device such as a charge coupled device (CCD) camera to acquire a raster image of a text image 101, as is known in the art. It may be able to scan an image line by line, section by section or it may image an entire page or sheet at once. Similarly, the image can come from any material with visual text to be read. This includes, for example, a page, sheet, package surface, slip of paper (as with some receipts), a video screen (e.g., at an airport), or the like. (The term "image" refers to an image file corresponding to any portion of a document or other printed material. For example, a newspaper image could correspond to one or more portions from a page, pages, or the entire newspaper.)

The auditory device 112 could comprise any suitable device to auditorily convey the read text to the user. For example, it could comprise one or more speakers and/or audio interface ports for connection to headphones or the like.

The user interface 106 may constitute any suitable components, known or not yet developed, to allow a user to conveniently control the reader. For example, the user interface could comprise one or more buttons, wheels, joysticks or other input control components that allow a user to manually control the reader without necessarily being able to see the user interface (i.e., it should allow a user to control at least some of the components without having to see them, e.g., by feeling them). In some embodiments, for example, the user interface could include five buttons, such as that shown in FIG. 1, with up ("U"), down ("D"), left ("L"), right ("R"), and select ("S") buttons, to allow a user to conveniently navigate through an image, as addressed more below.

The user interface could also include input ports (which may also function as output ports) such as universal serial bus (USB), so-called "Firewire", and/or wireless ports, e.g., to allow a user to import an electronic image that may or may not be in a text format. For example, portable document format (PDF) image files (or the like) could be imported for auditory reading to a user. In addition, the user interface could include speech-to-text capability, e.g., a microphone with suitable speech-to-text engine. Of course, as with any feature, especially those requiring substantial hardware and/or processing, trade-offs must be made between cost, power consumption, operating efficiency, performance accuracy, and feature capability.

The processor and memory may comprise any suitable combination of memory and processing circuits, components, or combinations of the same to implement processing engines to control the reader 102. For example, the memory could comprise read only memory (ROM) components, random access memory (RAM) components and non-volatile RAM such as flash memory or one or more hard drive devices. The memory 110 comprises device control (DC) software code 111 to control the reader 102 and execute its various functions. In the depicted embodiment, the device control code has at least several modules including an optical character recognition (OCR) module, and a text-to-speech (TTS) module. There may be more modules and in some embodiments, the modules may not necessarily be related to each other as shown.

The device control code, apart from controlling the TTTS and OCR modules, controls scanning (digitized image acquisition), reading navigation, and general system functionality. The OCR module converts the pre-text (e.g., rasterized scanned image) image into text data and characterizes it for convenient presentation to a user. (As used herein, "reading" means to convey or provide text in an audio form to a user.)

Figure 2:
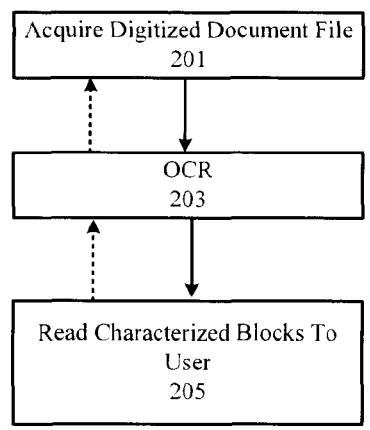
FIG. 2 is a flow diagram of a routine for implementing a read process in accordance with some embodiments.

FIG. 2 shows a routine for implementing a reader such as the reader 102 of FIG. 1. For example, it could be implemented in the DC software module 111 shown in FIG. 1. In some embodiments, conventional OCR and TTS modules may be used in cooperation with a multi-resolution text identification process discussed herein. (Note this could comprise developing an OCR module and/or configuring and/or augmenting an existing "off-the-shelf" OCR program.)

At 201, a digitized image with text to be read is acquired. This may be done through the importation of an electronic image or by scanning an image such as text-containing image 101 using the camera 108. The digital image file should be in a suitable form for the utilized OCR module. For example, many OCR packages typically accept raster image formats commonly found throughout the document management industry such as TIF, BMP, PCX and DCX, to mention just a few. Depending upon particular design considerations, a suitable OCR solution may be used to accept input from other sources such as fax input formats, PDF (or similar) formats, or common scanner driver formats such as TWAIN and ISIS.

At 203, optical character recognition (OCR) is performed on the acquired image file. Any suitable OCR tool (or module), presently available or specifically developed may be employed. Currently available OCR tools can provide sufficient flexibility to conform to needed performance for the multi-resolution text identification processes discussed herein. These processes will be addressed in more detail below.

(The dotted arrows in the flow diagram are meant to indicate that the depicted block processes do not necessarily occur sequentially. That is, they may be running concurrently with each other and be affected by characterizations, identifications, and OCR'ing that has already occurred. They also may affect how each other processes its tasks and certainly can affect how OCR'ing and even digitized image acquisition should be occurring.)

OCR programs are usually fairly flexible in allowing designers to adjust software imaging attributes, for example, through control over various imaging operators. Varying image attributes may enhance the manner in which the OCR software views text. For example, pertinent to the multi-resolution processes discussed below, an OCR package may allow for the software resolution (resolution of the digitized image file portion "seen" by the OCR module) to be suitably adjusted in conformance with methods discussed herein. If they do not allow for resolution adjustment or if their resolution adjustment is not suitable, they generally allow for the use and configuration of operators in accordance with techniques taught herein. They also typically allow a user to set margins of acceptable error when attempting to recognize a text image. Similarly, confidence levels for recognition depending on results of first iterations may be used and adjusted depending upon design considerations.

Error detection methodologies are also commonly employed. For example, error detection tools include spell checks and automatic corrections based on the software or user specific dictionaries. Various properties such as uppercase words, numeric expressions, roman numerals, proper nouns, math functions, abbreviation and acronyms may also be compared against appropriate more-particular dictionaries. Resolution of patterns involving text and numerals may be varied according to ambiguities dominant in the patterns.

Returning back to FIG. 2, finally, at 205, the OCR'd text is read to the user. Any suitable text-to-speech (TTS) solution may be used. In some embodiments, the user is allowed to navigate through the text sequentially or hierarchically. For example, in a hierarchal mode, with the user interface of FIG. 1, the right and left buttons could be used to move ahead or behind in equivalent levels (e.g., heading-to-heading in an article, title-to-title in a newspaper or magazine, or from chapter-to-chapter in a book). Likewise, the up and down buttons could be used for progressing to higher or lower levels, respectively. For example, when a desired heading is found, the user could press the down button to start reading the main paragraph text blocks under that heading.

Multi-Resolution Text Identification

One of the main problems for handling a large range of font sizes in an image arises from the fact that to process, detect and recognize a given font size, usually local operators (e.g., filtering, contrasting, and the like) are applied in a window whose size should conform, at least approximately, with the font size of the text for which the operator is operating. This is illustrated in FIG. 3A, where the image has text of different sizes. Shown here are at least three different font sizes that with conventional techniques, would likely require three different operator windows 302, 304, and 306. The main problem of dealing with the larger windows (302, 304) is that they normally require processing more pixels, because the operations are applied to larger windows at the original resolution. This results in excess processing time, which may be an encumbrance to a user.

To overcome this problem, some embodiments disclosed herein use a limited number (e.g., 1, 2, or several) of window sizes (e.g., window 306) to process an image over several passes at different image resolutions. This is illustrated in FIGS. 3B and 3C, where the images are progressively reduced from the original file dimensions (FIG. 3A), while the window size remains substantially the same. In some embodiments, this may be achieved by dropping pixels so that a window has the same (or close to) the same number of pixels regardless of the image size. (When referring to "image size", size is intended to refer to a layout dimension, e.g., length, width, area, relative to a utilized operator window (or window) dimension. So, as with FIGS. 3A to 3C, the size of the image, relative to the common window 306, progressively gets smaller.)

Using this approach, the processing (text identification, binarization, OCR, etc.) could initially be fine-tuned to work well for a limited font size range at the image's original resolution. Text with fonts falling in this range could then be identified via an iteration (or pass) of the image at this size. Larger font sizes can be successfully processed in the reduced resolution versions of the image.

To illustrate this with a more concrete example, the process (operator window, filtering, etc.) could be tuned, for example, to handle font sizes ranging from 6 to 14 pixels. For the next pass, the image area could be reduced, e.g., by a factor of four. To reduce the area by 4X, Half of the pixels in both the X and Y directions could be removed (e.g., via merger, filtering, or dropping). (Note, this assumes that remaining pixels are spaced apart from each other substantially the same distances as pixels in the original image. Thus, this results in the image area decreasing.) For this pass (area reduced by 4X), the window would now be "tuned" for font sizes of 12 to 28 pixels, referenced from the original resolution. The same process could occur for the next pass, resulting in the window being tuned for fonts of 24 to 56 pixels (referenced to original image resolution), and so on. Thus, with this example with three resolution levels, a global font size ranging from 6 to 56 pixels could be efficiently handled.

To achieve further computational savings, the process could instead start at the lowest resolution (FIG. 3C in this example)). Once the processing for this resolution is completed, there may be regions of the image at this level for which text has been successfully recognized by the OCR. These regions can then be excluded from processing in the next higher resolution level (FIG. 3B in this example), resulting in less pixels to process in this level, and thus, also resulting in reduced computational cost. When the last iteration in the original resolution level (FIG. 3A in this example) is completed, all (or a suitable portion) of the text from the original image should be identified.

FIG. 4 is a flow diagram showing a routine for identifying text using different resolution levels starting with the smallest resolution and progressing to the highest resolution (largest image size). The top row (402 to 420) corresponds to reducing the input image area progressively by a factor of 64 (three stages of dividing original L1 image by 4). The columns below each image box (L1, L2, L3, L4) correspond to a processing pipeline, which can be the same independent of the resolution level. Each column includes pre-processing (e.g., contrast enhancement, illumination correction, text detection, and/or adaptive binarization, among others) and text identification by the OCR. The processing pipeline can be fine tuned to perform optimally given a limited range of relative font sizes that will be encountered by the operator window.

At 404, the image is filtered (e.g., low pass filtered) in the X direction. Then, at 406, it is likewise (or similarly) filtered in the Y direction. At 408, it is down-sampled by a factor of 2 in each direction, i.e., half of its pixels in each direction are removed. This results with the level 2 (L2) image, which has 4 times less pixels than the input image and an area that is four times smaller.

From here, the L2 image is filtered and down-sampled at blocks 410 to 414, resulting in an L3 image, whose area is 16 times smaller than the original (L1) input image. The L3 image is subjected to filtering and down-sampling, this time at 416 to 420. This results in a level 4 (L4) image having 64 times less pixels and an area that is 64 times smaller than that of the original image.

From here, the L4 image is pre-processed at 422, and the first text identification pass occurs at 424. In this pass, the larger font text will be recognized. This identified text may be characterized, e.g., for reading to a user, and it is masked for the next text identification pass (on L3 image at this point).

The masked text information is provided to the pre-processing block at 426 and to the text identification block at 428, and text for the L3 version is then identified at 428. With text already identified from 424 ( and masked off), a smaller percentage of the L3 image is then reviewed for preprocessing at 426 and identification at 428.

This repeats at 430 and 432 for the L2 version, but with more identified text masked out, resulting in even less of the image remaining for text identification processing. Finally, masked information from the L2, L3, and L4 identified text is conveyed to Pre-process block 434 and text identification block 436 and text for the L1 version is identified. When this is done, text for most (if not all) of the original image should be identified.

This process is conceptually represented at FIGS. 5A, 5B, and 5C. FIG. 5C shows the L4 image, FIG. 5B shows the L3 image (with the text identified from L4, within the green rectangle in FIG. 5C, masked off as a solid black rectangle in FIG. 5B), and FIG. 5A shows the L2 image (with the text identified from L3 and L4 masked off).

In some embodiments, utilized filters (e.g., filters 404, 406, etc.) could be implemented with low-pass filters having a cutoff frequency of 0.25 cycles/pixel. In addition, a separable cubic-B-Spline filter could be used to provide a reasonable frequency response, only requiring five taps. In the flow diagram of FIG. 4, these operations are shown conceptually (filter in x, filter in y and then down-sampled), but in a real implementation, it should be appreciated that the filtering does not need to be applied to all the samples in the input image, but to the ones that will be conserved after the down-sampling operation to save computational cost. Note that with this example, three resolution levels (in addition to the original image) are shown, but in general the number of resolution levels will depend on the input image size and on the range of font sizes that are desired for recognition.

The computational advantages of this procedure depend on the content of the input image, i.e., the computational savings are higher as more regions are recognized in coarser scales. Another advantage is that the processing cost may be reduced, as it can be estimated, assuming that the cost per pixel for processing font sizes up to w is proportional to w (this would correspond, for example, to applying a separable filter to the image, which is probably the simplest operator that might be needed. More complicated operators, like non-separable filters, may take on the order of $w^2$ operations per pixel). Therefore, if it is desired for a range of font sizes from less than w to 4w, operations would typically need to be applied on window sizes of w, 2w, and 4w to the original image. Assuming a cost proportional to the number of pixels $N^2$ for an NXN image, the total cost with a traditional method using multiple operator windows would be proportional to $N^2(w+2w+4w)=7\ N^2w$. However, in the case of applying a multi-resolution technique disclosed herein, the same window of size w is applied for different image resolution passes, could have a total cost of $N^2(1+¼+1/16)=1.3125\ N^2w$ (in the limit the factor would be 4/3 instead of 1.3125). Therefore, this procedure by itself can potentially speed up the processing by at least a factor of 5X under the simple assumptions of linear cost with window size.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

The invention is not limited to the embodiments described, but can be practiced with modification and alteration within the spirit and scope of the appended claims.

It should be appreciated that example sizes/models/values/ranges may have been given, although the present invention is not limited to the same. As manufacturing techniques (e.g., photolithography) mature over time, it is expected that devices of smaller size could be manufactured. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:
1. An apparatus, comprising:
a reading device with a processor; and
memory coupled to the processor and configured to store instructions that, in response to being executed by the processor, cause the reading device to:

process an image into first and second processed images, each of the processed images having different sizes and corresponding to the image at different resolutions;

identify text in the first processed image, using optical character recognition and an operator window of a first size;

after identification of text in the first processed image, identify a first portion of the first processed image in which text was identified, the first portion corresponding to a first region of the image;

after identification of a first portion of the first processed image, select a second portion of the second processed image based on the first portion of the first processed image, wherein the second portion corresponds to a second region of the image that is different from the first region of the image; and after selection of a second portion of the second processed image, identify text in the second portion of the second processed image, using optical character recognition and an operator window of the first size.

2. The apparatus of claim 1, wherein the instructions, when executed by the processor, further cause the reading device to mask out a third portion of the second processed image to prevent the third portion from being processed for text identification in the second processed image, wherein the third portion of the second processed image corresponds to the first region of the image.

3. The apparatus of claim 1, wherein
the first processed image has a lower resolution than the second processed image.

4. The apparatus of claim 1, wherein process the image into first and second processed images includes filter the image.

5. The apparatus of claim 4, wherein filter the image includes filter the image with one or more B-Spline filters.

6. The apparatus of claim 4, wherein filter the image includes usage of a low-pass filter with a cutoff frequency at or above 0.25 cycles-per-pixel.

7. The apparatus of claim 1, in which the reading device further comprises a camera configured to acquire the image.

8. A method comprising:

processing, by a computing device, an original image into first and second processed images, each of the processed images having a different size and corresponding to the original image at different resolutions equal to or less than that of the original image;

performing, by the computing device, pre-processing on the first and second processed images using an operator window of substantially the same size;

by the computing device, identifying text in the first processed image using optical character recognition in a first font size range;

after identifying text in the first processed image, identifying a first portion of the first processed image in which text in which text was identified, the first portion corresponding to a first region of the original image;

after identifying a first portion of the first processed image, selecting, by the computing device, a second portion of the second processed image based on the first portion of the first processed image, wherein the second portion corresponds to a second region of the original image that is different from the first region of the original image; and by the computing device, after selecting a second portion of the second processed image, identifying text in the second portion of the second processed image using optical character recognition in a second font size range different from the first font size range.

9. The method of claim 8, further comprising masking out, by the computing device, a third portion of the second processed image to prevent the third portion from being processed for text identification in the second processed image, wherein the third portion of the second processed image corresponds to the first region of the original image.

10. The method of claim 8, wherein
the first processed image has a lower resolution than the second processed image.

11. The method of claim 8, in which processing the original image into first and second processed images comprises filtering the original image.

12. The method of claim 11, in which filtering the original image comprises filtering the original image with one or more B-Spline filters.

13. The method of claim 11, in which filtering the original image comprises using a low-pass filter with a cutoff frequency at or above 0.25 cycles-per-pixel.

14. The method of claim 8, wherein processing the original image comprises removing a proportion of the pixels of the original image in one or more directions.

15. The method of claim 8, wherein the first and second processed images include the original image.

16. The apparatus of claim 1, wherein process the image comprises remove a proportion of the pixels of the image in one or more directions.

17. One or more non-transitory computer-readable storage media containing instructions that, when executed by a computing device, cause the computing device to:

process an original image into first and second smaller images, each of the smaller images comprising a reduced-resolution version of the original image;

perform pre-processing on each of the first and second smaller images using one or more operator windows, each of the one or more operator windows of substantially the same pixel size between the first and second smaller images;

identify text using optical character recognition in the original image using the one or more operator windows, such that identified text in the original image is identified within a first font size range relative to the original image;

after identification of text using optical character recognition in the original image, identify a region of the original image in which text was identified;

after identification of a region of the original image, select a first portion of the first smaller image based on the region or the original image, wherein the first portion of the first smaller image corresponds to a first region of the original image that is different from the region of the original image;

after selection of a first portion of the first smaller image, identify text in the first portion of the first smaller image, using optical character recognition and the one or more operator windows, such that identified text in the first smaller image is identified within a second font size range relative to the original image, wherein the second font size range is different from the first font size range;

after identification of text in the first portion of the first smaller image, identify a second portion of the first smaller image in which text was identified, the second portion of the first smaller image corresponding to a second region of the original image;

after identification of a second portion of the first smaller image, select a first portion of the second smaller image based on the second region of the original image and the region of the original image, wherein the first portion of the second smaller image corresponds to a third region of the original image that is different from the region of the original image and different from the second region of the original image; and after selection of a first portion of the second smaller image, identify text in the first portion of the second smaller image, using optical character recognition and the one or more operator windows, such that identified text in the second smaller image is identified within a third font size range relative to the original image, wherein the third font size range is different from the first font size range and different from the second font size range.

18. The computer-readable media of claim 17, further containing instructions that, when executed by a computing device, cause the computing device to:

mask out a third portion of the first smaller image to prevent the third portion from being processed for text identification in the first smaller image, wherein the third portion of the first smaller image corresponds to the first region of the original image.

19. The computer-readable media of claim 17, wherein the second smaller image has a lower resolution than the first smaller image.

20. The computer-readable media of claim 17, in which process the original image into first and second smaller images comprises filter the original image.

21. The computer-readable media of claim 20, in which filter the original image comprises filter the original image with one or more B-Spline filters.

22. The computer-readable media of claim 20, in which filter the original image comprises usage of a low-pass filter with a cutoff frequency at or above 0.25 cycles-per-pixel.

23. The computer-readable media of claim 17, further containing instructions that, when executed by a computing device, cause the computing device to:

operate a camera to acquire the original image.

24. The computer-readable media of claim 17, wherein process the original image comprises remove a proportion of the pixels of the original image in one or more directions.

25. The computer-readable media of claim 24, wherein remove a proportion of the pixels of the original image comprises:

remove half of the pixels in each dimension to produce the first smaller image;

remove half of the pixels in each dimension from the first smaller image to produce the second smaller image; and repeat removing half of the pixels in each dimension from previously-produced smaller images to produce one or more additional smaller images.

* * * * *

UNITED STATES PATENT AND TRADEMARK OFFICE
CERTIFICATE OF CORRECTION

PATENT NO. : 8,611,661 B2  
APPLICATION NO. : 11/964590  
DATED : December 17, 2013  
INVENTOR(S) : Oscar Nestares et al.

It is certified that error appears in the above-identified patent and that said Letters Patent is hereby corrected as shown below:

In the Claims

Column 7, Claim 8, Lines 55-56, "...in which text in which text" should read --...in which text...--.

Column 8, Claim 17, Line 50, "region or the original image" should read --...region of the original image...--.

Signed and Sealed this
Twenty-first Day of April, 2015

Michelle K. Lee
*Director of the United States Patent and Trademark Office*